(12) United States Patent
Choi et al.

(10) Patent No.: US 9,549,271 B2
(45) Date of Patent: Jan. 17, 2017

(54) DEVICE AND METHOD FOR TRACKING SOUND SOURCE LOCATION BY REMOVING WIND NOISE

(71) Applicant: KOREA INSTITUTE OF SCIENCE AND TECHNOLOGY, Seoul (KR)

(72) Inventors: Jong Suk Choi, Seoul (KR); Van Quang Nguyen, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 24 days.

(21) Appl. No.: 14/758,056

(22) PCT Filed: Dec. 27, 2013

(86) PCT No.: PCT/KR2013/012305
§ 371 (c)(1),
(2) Date: Jun. 26, 2015

(87) PCT Pub. No.: WO2014/104815
PCT Pub. Date: Jul. 3, 2014

(65) Prior Publication Data
US 2015/0358750 A1      Dec. 10, 2015

(30) Foreign Application Priority Data

Dec. 28, 2012   (KR) ..................... 10-2012-0155967

(51) Int. Cl.
*A61F 11/06* (2006.01)
*H04R 29/00* (2006.01)
(Continued)

(52) U.S. Cl.
CPC ............. *H04R 29/00* (2013.01); *G10L 25/48* (2013.01); *H04N 7/188* (2013.01); *H04R 3/002* (2013.01);
(Continued)

(58) Field of Classification Search
CPC .............................. H04R 29/00; G10L 25/48
See application file for complete search history.

(56) References Cited

U.S. PATENT DOCUMENTS 7,274,794 B1 * 9/2007 Rasmussen ............ H04R 3/005
381/92
7,885,420 B2    2/2011 Hetherington et al.
(Continued)

FOREIGN PATENT DOCUMENTS

KR      10-0883712 B1    2/2009
KR      10-1034831 B1    5/2011

OTHER PUBLICATIONS

International Search Report, Mar. 31, 2014.

*Primary Examiner* — Simon King
(74) *Attorney, Agent, or Firm* — Goldilocks Zone IP Law

(57) ABSTRACT

Disclosed are a device and a method for tracking a sound source location by removing wind noise. The disclosed method for tracking a sound source by removing wind noise comprises the steps of: performing a Fourier transform for input signals of a time domain received by a plurality of microphones; detecting a first sound source section on the basis of an average power value of the Fourier-transformed input signals; detecting a second sound source section from which wind noise has been removed, on the basis of the first sound source section and a difference of power values of the input signals received by the microphones; and detecting a location of a sound source on the basis of the second sound source section and a phase difference of the input signals received by the plurality of microphones.

10 Claims, 7 Drawing Sheets

(51) Int. Cl.
*H04R 3/00* (2006.01)
*G10L 25/48* (2013.01)
*H04N 7/18* (2006.01)
*G10L 25/78* (2013.01)
*G10L 21/0208* (2013.01)

(52) U.S. Cl.
CPC ........... *H04R 3/005* (2013.01); *G10L 21/0208* (2013.01); *G10L 25/78* (2013.01); *H04R 2410/07* (2013.01)

(56) References Cited

U.S. PATENT DOCUMENTS

| | | | |
|---|---|---|---|
| 2004/0165736 A1* | 8/2004 | Hetherington | G10L 21/0208 381/94.3 |
| 2009/0299742 A1* | 12/2009 | Toman | G10L 21/0208 704/233 |
| 2011/0004470 A1 | 1/2011 | Konchitsky et al. | |
| 2011/0038489 A1* | 2/2011 | Visser | G01S 3/8006 381/92 |
| 2011/0123044 A1 | 5/2011 | Hetherington et al. | |
| 2012/0121100 A1* | 5/2012 | Zhang | G10L 21/0208 381/71.1 |
| 2012/0148067 A1 | 6/2012 | Petersen et al. | |
| 2012/0191447 A1 | 7/2012 | Joshi et al. | |
| 2013/0308784 A1* | 11/2013 | Dickins | H04R 3/005 381/56 |
| 2015/0055788 A1* | 2/2015 | Zakis | H04R 3/002 381/71.1 |

* cited by examiner

DEVICE AND METHOD FOR TRACKING SOUND SOURCE LOCATION BY REMOVING WIND NOISE

CROSS REFERENCE TO RELATED PATENT APPLICATIONS

This application claims the benefit under 35 U.S.C. Section 371, of PCT International Application No. PCT/KR2013/012305, filed Dec. 27, 2013, which claimed priority to Korean Patent Application No. 10-2012-0155967, filed Dec. 28, 2012, the disclosures of which are hereby incorporated by the references.

TECHNICAL FIELD

Embodiments relate to a device and method for localizing a sound source, and more particularly, to a device and method for localizing a sound source in an environment having wind noise.

BACKGROUND ART

A sound source localizing technique for an outdoor intelligent CCTV camera is to sense an important sound event such as a scream of a human, a sound of collision of vehicles, or the like, turns the CCTV camera to a location where the corresponding sound source is generated to intensively monitor the event, and informs the monitoring result to a relevant security department so that surrounding situations may be more safely protected.

However, an outdoor environment has various and random noise, different from an indoor environment. Such noise representatively includes motorcycle noise, engine sound of vehicles, wind sound or the like, and a false alarm (or, misrecognition) frequently happens due to such noise. In case of wind noise, it is difficult to find regular patterns, in comparison to other noise (for example, vehicle or motorcycle noise) since the wind strength and direction varies randomly due to various factors. An existing sound direction monitoring system generally ensures good operation only in a silent indoor environment. If there is noise, the existing sound direction monitoring system may operate satisfactorily just in an environment having noise which is very low or very stable. In other words, there is urgently needed a sound direction monitoring technique which may effectively respond to wind noise which is always present in an outdoor environment.

DISCLOSURE

Technical Problem

The present disclosure is directed to localizing a sound source by effectively removing wind noise.

The present disclosure is also directed to implementing a security camera having an improved sound source localizing function.

Technical Solution

In one general aspect, there is provided a method for localizing a sound source by removing wind noise, which includes: performing a Fourier transform for input signals of a time domain received by a plurality of microphones; detecting a first sound source section on the basis of an average power value of the Fourier-transformed input signals; detecting a second sound source section from which wind noise has been removed, on the basis of the first sound source section and a difference of power values of the input signals received by the microphones; detecting a location of a sound source on the basis of the second sound source section and a phase difference of the input signals received by the plurality of microphones; and calculating reliability for the detection of a location of the sound source, wherein the detecting of a first sound source section further includes detecting the first sound source section only when the first sound source section is continuously formed.

In an embodiment, a method for localizing a sound source by removing wind noise may include: performing a Fourier transform for input signals of a time domain received by a plurality of microphones; detecting a first sound source section on the basis of an average power value of the Fourier-transformed input signals; detecting a second sound source section from which wind noise has been removed, on the basis of the first sound source section and a difference of power values of the input signals received by the microphones; and detecting a location of a sound source on the basis of the second sound source section and a phase difference of the input signals received by the plurality of microphones.

In an embodiment, the method for localizing a sound source by removing wind noise may further include calculating reliability for the detection of a location of the sound source, and the detecting of a first sound source section may further include detecting the first sound source section only when the first sound source section is continuously formed.

In an embodiment, in the detecting of a first sound source section of the method for localizing a sound source by removing wind noise, the average power value of the input signals may be determined using Equation 1, and the first sound source section may be determined using Equation 2, where n represents a frame index, $f_{min}$ represents a minimum frequency of the input signals, $f_{max}$ represents a maximum frequency of the input signals, and $Nf$ represents the number of frequency bins between the minimum frequency ($f_{min}$) and the maximum frequency ($f_{max}$). Equations 1 and 2 will be described later.

In an embodiment, in the method for localizing a sound source by removing wind noise, the $f_{min}$ may be 300 Hz, and the $f_{max}$ may be 3.4 kHz.

In an embodiment, in the detecting of a second sound source section of the method for localizing a sound source by removing wind noise, a cross-channel power difference may be calculated using Equation 3, and the presence of wind noise may be determined using Equation 4, where P represents the number of microphone pairs, and $TH_2$ is 5 dB.

In an embodiment, a device for localizing a sound source by removing wind noise includes: a plurality of microphones; a Fourier transform unit configured to performing a Fourier transform for input signals of a time domain received by the plurality of microphones; a first sound source section detecting unit configured to detect a first sound source section on the basis of an average power value of the Fourier-transformed input signals; a second sound source section detecting unit configured to detect a second sound source section from which wind noise has been removed, on the basis of the first sound source section and a difference of power values of the input signals received by the microphones; and a sound source position detecting unit configured to detect a location of a sound source on the basis of the second sound source section and a phase difference of the input signals received by the plurality of microphones.

In an embodiment, the device for localizing a sound source by removing wind noise may further include a reliability calculating unit configured to calculate reliability for the detection of a location of the sound source, and the first sound source section detecting unit may detect the first sound source section only when the first sound source section is continuously formed.

In an embodiment, in the device for localizing a sound source by removing wind noise, the first sound source section detecting unit may determine the average power value of the input signals by using Equation 1, and the first sound source section detecting unit may determine the first sound source section by using Equation 2, where n represents a frame index, $f_{min}$ represents a minimum frequency of the input signals, $f_{max}$ represents a maximum frequency of the input signals, and $N_f$ represents the number of frequency bins between the minimum frequency ($f_{min}$) and the maximum frequency ($f_{max}$).

In an embodiment, in the device for localizing a sound source by removing wind noise, the $f_{min}$ may be 300 Hz, and the $f_{max}$ may be 3.4 kHz.

In an embodiment, in the device for localizing a sound source by removing wind noise, the second sound source section detecting unit may calculate a cross-channel power difference by using Equation 3, and the second sound source section detecting unit may determine the presence of wind noise by using Equation 4, where P represents the number of microphone pairs, and $TH_{-2}$ is 5 dB.

In another aspect of the present disclosure, there is provided a device for localizing a sound source by removing wind noise, which includes: a plurality of microphones; a Fourier transform unit configured to performing a Fourier transform for input signals of a time domain received by the plurality of microphones; a first sound source section detecting unit configured to detect a first sound source section on the basis of an average power value of the Fourier-transformed input signals; a second sound source section detecting unit configured to detect a second sound source section from which wind noise has been removed, on the basis of the first sound source section and a difference of power values of the input signals received by the microphones; a sound source position detecting unit configured to detect a location of a sound source on the basis of the second sound source section and a phase difference of the input signals received by the plurality of microphones; and a reliability calculating unit configured to calculate reliability for the detection of a location of the sound source, wherein the first sound source section detecting unit detects the first sound source section only when the first sound source section is continuously formed.

Advantageous Effects

According to an embodiment of the present disclosure, a location of a sound source may be exactly figured out by effectively removing wind noise.

According to another embodiment of the present disclosure, it is possible to implement a security camera having an improved sound source localizing function.

BEST MODE

Figure 1:
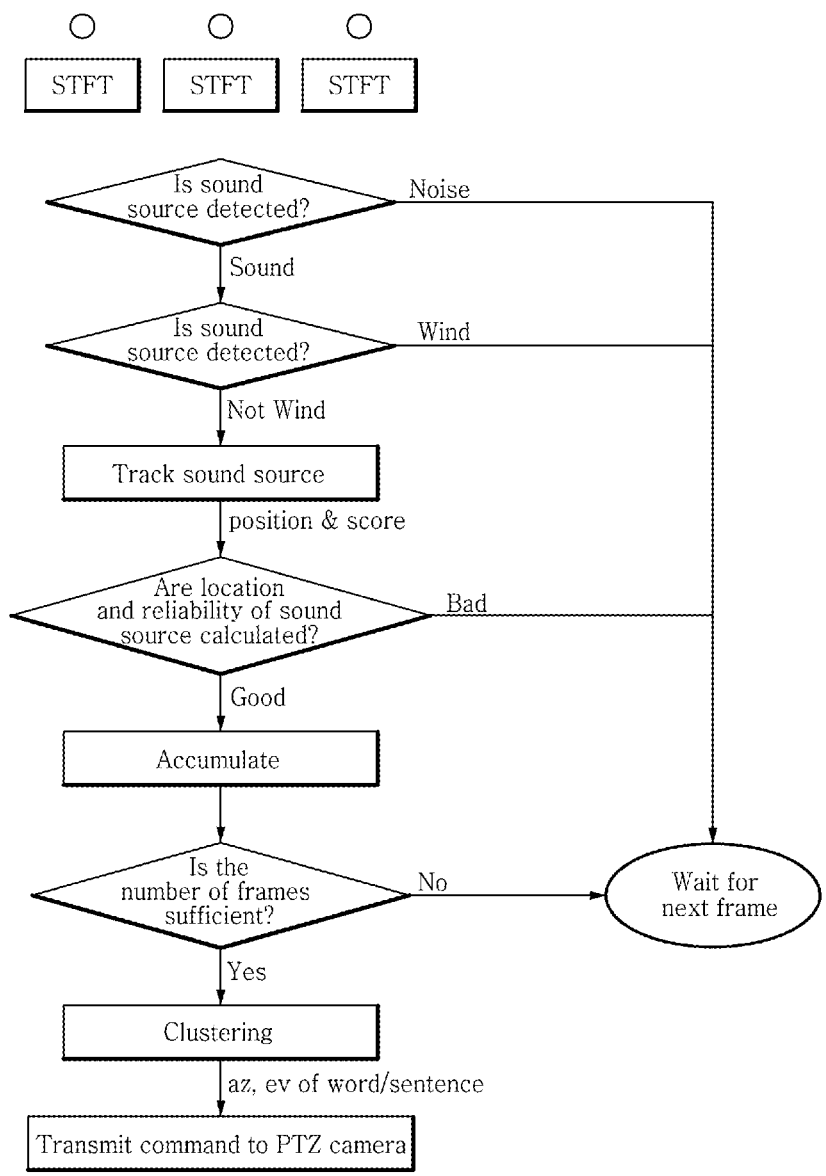
FIG. 1 is a flowchart for illustrating a method for localizing a sound source according to an embodiment of the present disclosure.

The embodiments described in the specification may be implemented as hardware entirely, hardware partially and software partially, or software entirely. In the specification, the term "unit", "module", "device", "system" or the like indicates a computer-related entity like hardware, a combination of hardware and software, or software. For example, the term "unit", "module", "device", "system" or the like used in the specification may be a process, a processor, an object, an executable file, a thread of execution, a program, and/or a computer, without being limited thereto. For example, both a computer and an application executed in the computer may correspond to the term "unit", "module", "device", "system" or the like in the specification.

The embodiments have been described with reference to the flowchart shown in the figure. For brief explanation, the method has been illustrated and described as a series of blocks, but the present disclosure is not limited to the order of the blocks. In other words, some blocks may be executed simultaneously with other blocks or in a different order from those illustrated and described in this specification, and various diverges, flow paths, block sequences may also be implemented if they give the equivalent or similar results. In addition, in order to implement the method described in the specification, it is also possible not to demand all blocks. Further, the method for predicting a surgery stage may be implemented in the form of a computer program for executing a series of processes, and the computer program may also be recorded on a computer-readable recording medium.

The following detailed description of the present disclosure refers to the accompanying drawings, in which exemplary embodiments are shown. These embodiments are fully explained in detail so that the present disclosure can be implemented by those skilled in the art. It should be understood that various embodiments of the present disclosure need not be exclusive to each other. For example, specific shapes, structures and characteristics disclosed herein may be implemented as other embodiments without departing from the scope of the present disclosure. Also, it should be understood that locations and dispositions of individual components in each embodiment disclosed herein may be modified without departing from the scope of the present disclosure. Therefore, the following detailed description is not intended to limit the scope of the present disclosure, and the scope of the present disclosure is defined only by the appended claims and their equivalents, as long as they are appropriately explained. In the drawings, like reference symbols designate identical or similar functions over several figures.

FIG. 1 is a flowchart for illustrating a method for localizing a sound source according to an embodiment of the present disclosure. In other words, a multi-channel input signal (input sound) is received by using a microphone array, and then a short-time frequency transformation (STFT) is performed first to convert the input signal of a time domain into a frequency section. In addition, a sound source section is detected from the input signal in the frequency section by using a general voice activity detection (VAD) unit. Together with the detection of a sound source section, a wind direction and removal (WDR) unit performs a wind detection and removal process to determine whether a current frame is wind noise or not, by using the multi-channel signal of the time domain. This is because wind noise generally has a great energy value and thus is mostly detected as a sound source section, and this causes many erroneous direction detections.

Therefore, frames corresponding to wind noise are excluded from the VAD detection result by means of WDR, and thus it is possible to securely perform sound source direction detection only for sound event frames. Moreover, for a sound source having very short impulses (in most cases, this is a meaningless sound), the system of the present disclosure gives reasonable threshold values to estimated reliability of an input sound source and duration time of sound source section detection (the number of frames which are determined as sound source sections continuously), so that clustering is performed only for sound source events corresponding to an accumulation condition and thus locations (azimuth and elevation) of the corresponding sound source events are output.

In a final stage, the location (azimuth, elevation) of the generated sound source event is transmitted to a camera and controlled by using a HTTP protocol of an IP camera.

1. Voice Activity Detection (VAD)

If a Fourier transform is performed to an input sound x(n,t), this may be expressed as X(n,f). Here, n represents a frame index, and t represents time.

In a frequency section for an $n^{th}$ frame, a power value may be calculated as in Equation 1 below. Generally, wind noise reaches each microphone with different intensity, and thus an average power value of the input signal is calculated by using an average of input power values of all channels as in Equation 1.

$$P(n) = \frac{1}{M}\sum_{m=1}^{M}\left(10\log 10\left(\frac{1}{N_f}\sum_{f=f_{min}}^{f=f_{max}} X^2(n,f)\right)\right) \quad \text{[Equation 1]}$$

Here, $f_{min}$ and $f_{max}$ represents a minimum frequency (300 Hz) and maximum frequency (3.4 k Hz), respectively. $N_f$ represents the number of frequency bins between the minimum frequency ($f_{min}$) and the maximum frequency ($f_{max}$).

The detection of a sound source section is determined using Equation 2 below.

$$vad(n) = \begin{cases} 1 & \text{if } P(n) - P_{noise}(n) > TH_1 \\ 0 & \text{otherwise} \end{cases} \quad \text{[Equation 2]}$$

Here, $P_{noise}(n)$ and $TH_1$ represents a background noise power for the $n^{th}$ frame and a sound source detection threshold value (namely, 3 dB), respectively. In other words, if a difference between a power value of a current frame and a power value of background noise is greater than the threshold value TH, the corresponding region is determined as a region where a sound source exists, and if not, the region is determined as a region where a sound source does not exist.

Generally, the performance of detection of a sound source section greatly depends on the accuracy of estimation of a background noise power. In this study, an adaptive noise estimation method considering time variation has been used. In other words, this may be expressed as Equation 3 below.

$$P_{noise}(n+1) = \begin{cases} \alpha_1 P_{noise}(n) + (1-\alpha_1)P(n) & \text{if } VAD(n) = 0 \\ \alpha_2 P_{noise}(n) + (1-\alpha_2)P(n) & \text{otherwise} \end{cases} \quad \text{[Equation 3]}$$

Here, estimation factors $\alpha_1$ and $\alpha_2$ are set to be 0.95 and 0.99, respectively. However, this is just an example.

2. Wind Detection and Removal (WDR)

Figure 2:
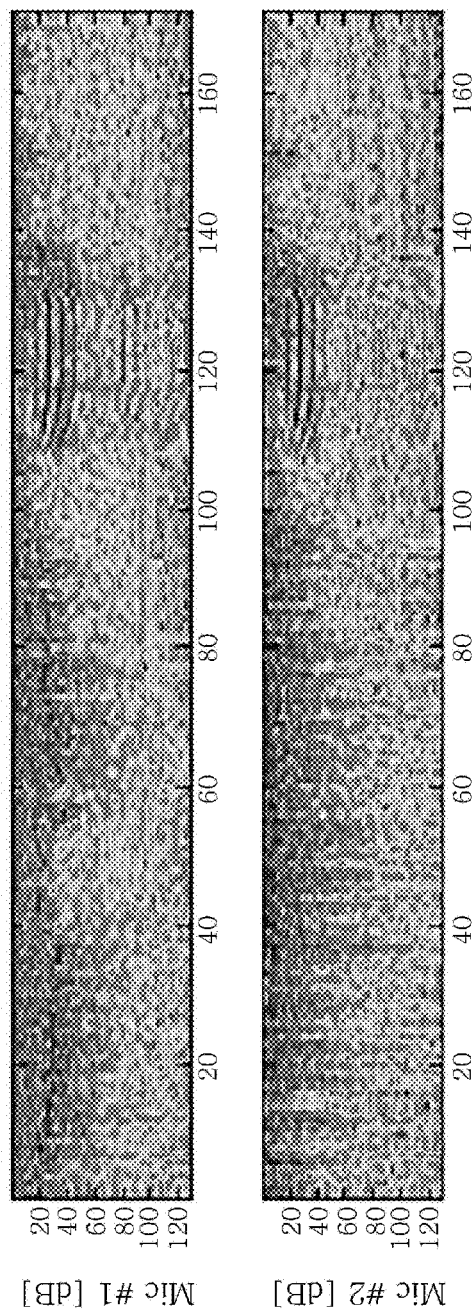
FIG. 2 is a comparative spectrogram diagram showing an input signal of a microphone according to an embodiment of the present disclosure.
Figure 3:
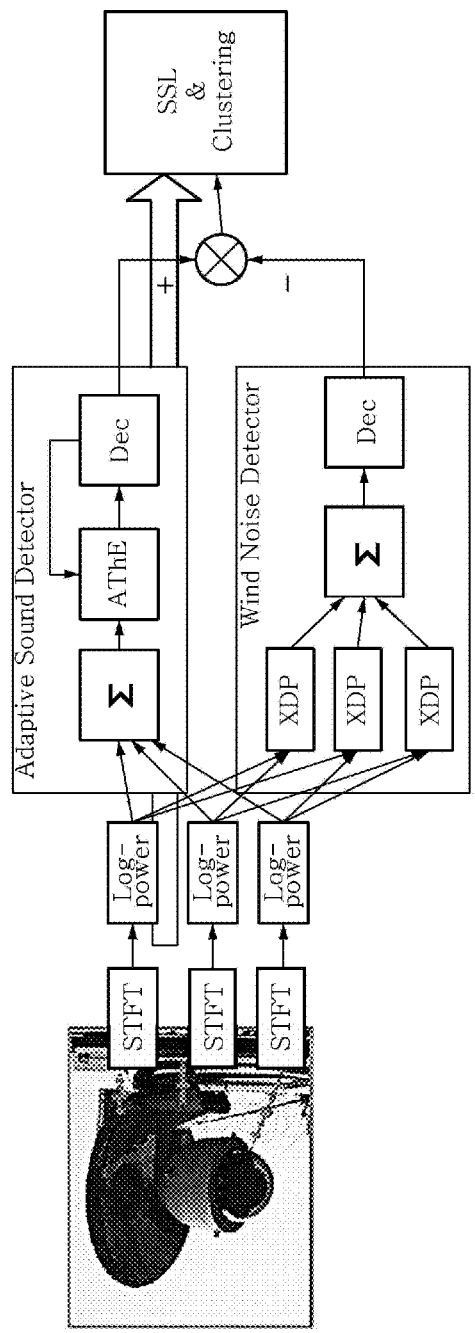
FIG. 3 is a flowchart for illustrating a method for localizing a sound source according to an embodiment of the present disclosure.

Wind noise has different frequency distributions in various channels (microphones) in comparison to human voices or other general noise. In other words, as depicted in circles marked in Microphones #1 and #2 in FIG. 2, it would be found that very different energy distributions are shown at different channels for each frequency, at the same time point. Therefore, even though an existing voice activity detection (VAD) unit using only energy information is weak in handling, if the above characteristic is used, this problem may be effectively solved.

For this, in this study, a cross-channel different power (XDP) is used as a criterion for determining wind noise as in Equation 4 below to perform wind detection and removal (WDR). In other words, if a region has a higher XDP, this region is higher likely to be wind noise, and thus an erroneously determined wind noise section is excluded from an existing VAD unit. Here, P represents the number of microphone pairs, and other variables are identical to those of Equation 1.

$$\Delta P(n) = \quad \text{[Equation 4]}$$
$$\frac{1}{PN_f}\sum_{f_{min}}^{f_{min}}\sum_{m=1}^{P}\|10\log 10(X_i^2(n,f)) - 10\log 10(X_j^2(n,f))\|$$

A detailed wind noise determining method is as follows.

In other words, the cross-channel different power (XDP) is compared with the threshold value ($TH_2$) by using Equation 5 below. Then, if the cross-channel different power (XDP) is greater than the threshold value, it is determined that wind noise exists, and if not, it is determined that wind noise does not exist. Here, the threshold value ($TH_2$) is set to be 5 dB.

$$wdr(n) = \begin{cases} 1 & \Delta P(n) > TH_2 \\ 0 & \text{otherwise} \end{cases} \quad \text{[Equation 5]}$$

In order to finally exclude the wind noise section and detect only a meaningful sound source section, the results of Equations 2 and 5 are combined as in Equation 6 below.

$$VAD(n) = vad(n)(1 - wdr(n)) \quad \text{[Equation 6]}$$

If Equation 6 is arranged again, Equation 7 below may be obtained.

$$VAD(n) = \begin{cases} 1 & \text{if } P(n) - P_{noise}(n) > TH_1 \text{ and } \Delta P(n) > TH_2 \\ 0 & \text{otherwise} \end{cases} \quad \text{[Equation 7]}$$

3. Evaluation of Performance of the WDR Using Actual Data

Figure 4:
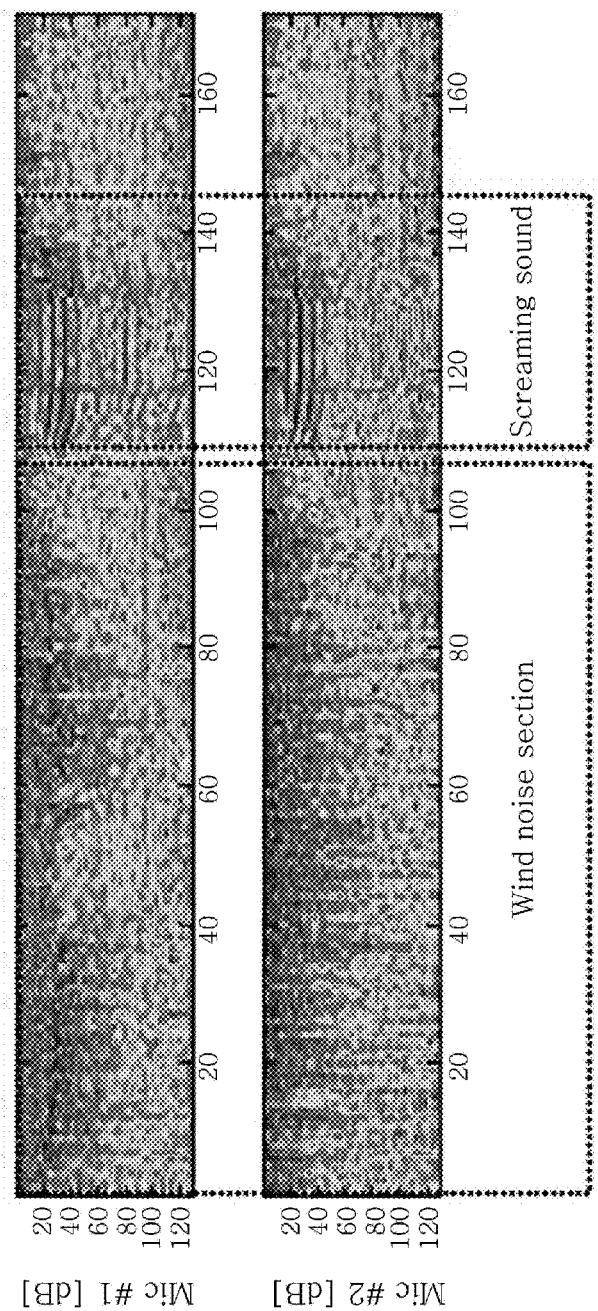
FIG. 4 is a diagram showing a wind noise section and a screaming sound in the comparative spectrogram diagram of an input signal of a microphone according to an embodiment of the present disclosure.
Figure 5:
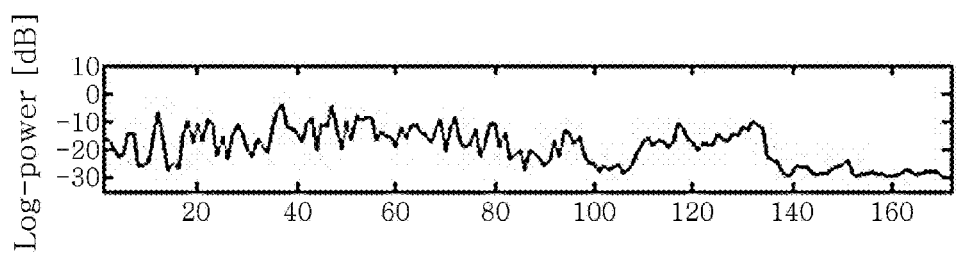
FIG. 5 is a log-power variation graph for an input signal of an existing microphone.
Figure 6:
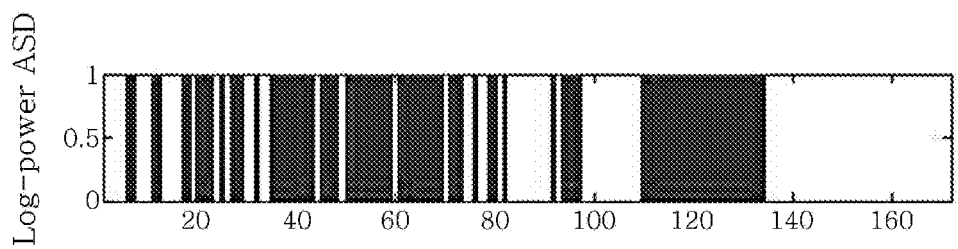
FIG. 6 is a graph showing a sound source section detection result for an input signal of an existing microphone.

In order to check the performance of the WDR proposed in the present disclosure, a sound source section detecting experiment was performed using actual sound source data where wind noise and screaming sound coexist as shown in FIG. 4. In an existing VAD method, any one channel may be selected from multi-channel input signals to calculate a log-power value (FIG. 4) by using Equation 1, and then a sound source section may be detected as shown in FIG. 5. As a result, as seen in FIG. 4, the wind noise section also has a high power value, and thus it may be found that most wind noise sections are erroneously detected as meaningful sound source sections.

Figure 7:
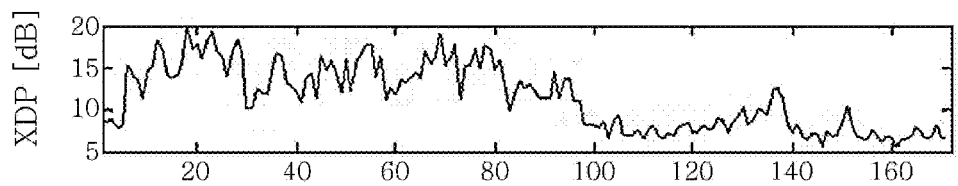
FIG. 7 is a log-power variation graph for an input signal of a microphone according to an embodiment of the present disclosure.
Figure 8:
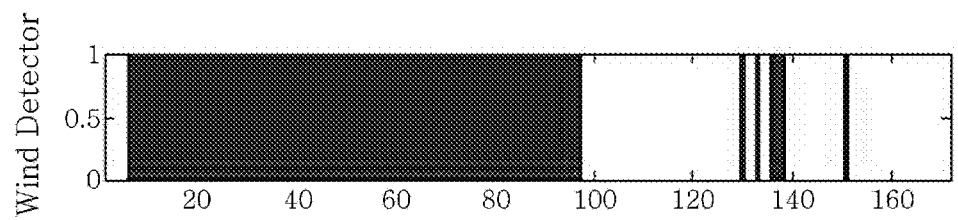
FIG. 8 is a graph showing a wind noise section detection result for an input signal of a microphone according to an embodiment of the present disclosure.
Figure 9:
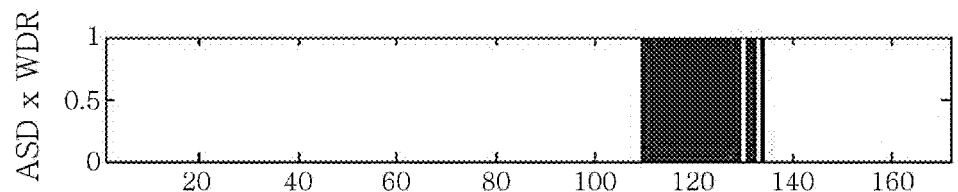
FIG. 9 is a graph showing a sound source section detection result for an input signal of a microphone according to an embodiment of the present disclosure.

However, in the WDR method proposed in this study, the cross-channel power difference may be depicted as a graph as shown in FIG. 7, and thus if it is determined by using Equation 5 whether wind exists, it may be found that a region where wind noise exists is accurately detected as shown in FIG. 8. Therefore, if this result is combined with a sound source section determined according to an existing VAD method by using Equation 6, it may be found that important event sounds (for example, a region having a screaming sound of a human or the like) are maintained while exactly excluding a wind noise section as shown in FIG. 9.

4. Sound Source Localization

First, a cross-channel phase difference of each frequency for an input sound source signal may be calculated as in Equation 8 below.

$$\overline{\omega}_{ij}(n, f) = \frac{X_i(n, f) X_i(n, f)^*}{\|X_i(n, f)\| \|X_i(n, f)\|} \quad \text{[Equation 8]}$$

Here, X* and ‖X‖ represent a complex-conjugate and an amplitude for a plurality of X, respectively.

In order to find a location (namely, azimuth/elevation) of the input sound source signal, an angular distance in a map (namely, a map about $M_{ij}(f,\theta,\phi)$, a frequency (f), and a cross-channel phase difference for azimuth and elevation) prepared in advance is calculated as in Equation (9) below and compared.

$$C_{ij}(n, f, \theta, \varphi) = \left\| -\frac{\omega_{ij}(n, f)}{M_{ij}(f, \theta, \varphi)} \right\| \quad \text{[Equation 9]}$$

Here, M represents a map, ij represents a channel index, f represents a frequency, ν represents azimuth, φ represents elevation, and n represents a frame index.

Next, in order to calculate a phase difference between the map (M) and the input frame for azimuth and elevation in Equation 9, a sum of the frequency (f) and the microphone pair (ij) is calculated as in Equation 10, respectively.

$$C(n, \theta, \varphi) = \sum_{ij} \sum_{f} C_{ij}(n, f, \theta, \varphi) \quad \text{[Equation 10]}$$

Finally, a location and reliability (reliability score) of the input sound source are calculated using Equation 11 below. In other words, indexes (θ, φ) having a maximum value of Equation 10 and maximum reliability s(n) are calculated as the location (azimuth and elevation) of the corresponding input sound source.

$$\theta(n), \varphi(n), s(n) = \underset{\theta, \varphi}{\operatorname{argmax}} C(n, \theta, \varphi) \quad \text{[Equation 11]}$$

5. Accumulation and Clustering

Figure 10:
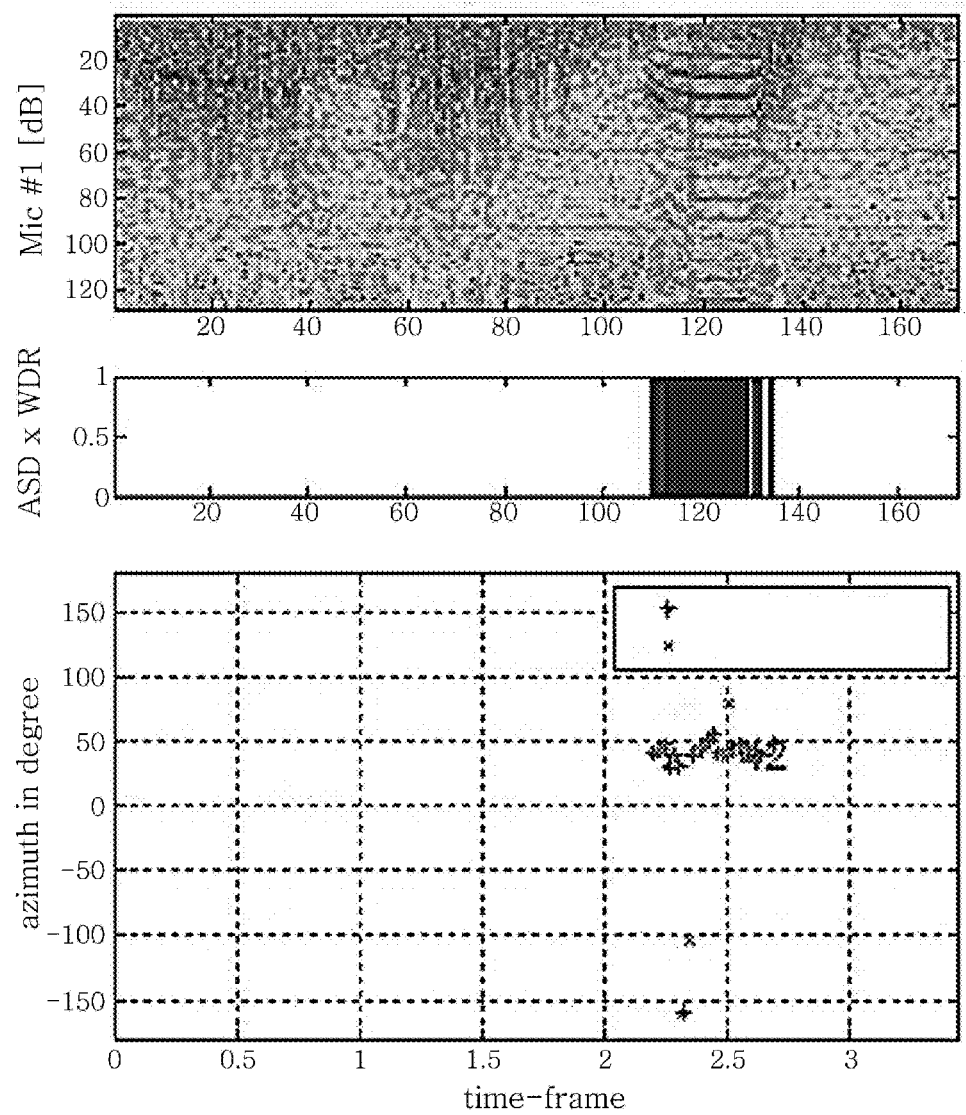
FIG. 10 is a graph showing an input signal of a microphone, a sound source section detection result, and a sound source section detection result after reliability and clustering are reflected, according to an embodiment of the present disclosure.

In the present disclosure, in order to calculate a location more stably for each input sound source event, when frames where VAD is detected are continuously connected and thus certain frames are accumulated, a location of the corresponding sound source section (namely, regarded as an event) is finally calculated by means of clustering and output. FIG. 10 shows an input signal (a top portion), a sound source section detection result (a middle portion), and a direction detection result and clustering result (a bottom portion). In more detail, FIG. 10 (a top portion) shows a spectrogram for an input signal of Microphone #1, FIG. 10 (a middle portion) shows a detection result of a final VAD section for the input signal, and FIG. 10 (a bottom portion) shows azimuth of each frame with * (in blue) as a sound source localizing result for the same and also shows a sound source location for this event (screaming sound) after final clustering with 42 degree (in red).

Though the present disclosure has been described with reference to the embodiments and specific components depicted in the drawings, it is just for better understanding of the present disclosure, and the present disclosure is not limited to the embodiments. It should be understood by those skilled in the art that various modifications and equivalents can be made from the disclosure.

Therefore, the present disclosure should not be defined as being limited to the embodiments, but all equivalents and modifications equivalent to the appended claims should be regarded as falling into the scope of the present disclosure.

INDUSTRIAL APPLICABILITY

According to an embodiment of the present disclosure, a location of a sound source may be accurately figured out by effectively removing wind noise.

The invention claimed is:

1. A method for localizing a sound source by removing wind noise, comprising:
  performing a Fourier transform for input signals of a time domain received by a plurality of microphones;
  detecting a first sound source section on the basis of an average power value of the Fourier-transformed input signals;
  detecting a second sound source section from which wind noise has been removed, on the basis of the first sound source section and a difference of power values of the input signals received by the microphones; and detecting a location of a sound source on the basis of the second sound source section and a phase difference of the input signals received by the plurality of microphones.

2. The method for localizing a sound source by removing wind noise according to claim 1, further comprising:
calculating reliability for the detection of a location of the sound source,
wherein the detecting of a first sound source section further includes detecting the first sound source section only when the first sound source section is continuously formed.

3. The method for localizing a sound source by removing wind noise according to claim 1,
wherein in the detecting of a first sound source section, the average power value of the input signals is determined using Equation 1 below, and
wherein the first sound source section is determined using Equation 2 below:

$$P(n) = \frac{1}{M} \sum_{m=1}^{M} \left( 10\log 10 \left( \frac{1}{N_f} \sum_{f=f_{min}}^{f=f_{max}} X^2(n, f) \right) \right) \quad \text{[Equation 1]}$$

$$vad(n) = \begin{cases} 1 & \text{if } P(n) - P_{noise}(n) > TH_1 \\ 0 & \text{otherwise} \end{cases} \quad \text{[Equation 2]}$$

where n represents a frame index, $f_{min}$ represents a minimum frequency of the input signals, $f_{max}$ represents a maximum frequency of the input signals, and $N_f$ represents the number of frequency bins between the minimum frequency ($f_{min}$) and the maximum frequency ($f_{max}$).

4. The method for localizing a sound source by removing wind noise according to claim 3,
wherein the $f_{min}$ is 300 Hz, and the $f_{max}$ is 3.4 kHz.

5. The method for localizing a sound source by removing wind noise according to claim 3,
wherein in the detecting of a second sound source section, a cross-channel power difference is calculated using Equation 3 below, and
wherein the presence of wind noise is determined using Equation 4 below:

$$\Delta P(n) = \quad \text{[Equation 3]}$$
$$\frac{1}{PN_f} \sum_{f_{min}}^{f_{min}} \sum_{m=1}^{P} \|10\log10(X_i^2(n, f)) - 10\log10(X_j^2(n, f))\|$$

$$wdr(n) = \begin{cases} 1 & \Delta P(n) > TH_2 \\ 0 & \text{otherwise} \end{cases} \quad \text{[Equation 4]}$$

where P represents the number of microphone pairs, and $TH_2$ is 5 dB.

6. A device for localizing a sound source by removing wind noise, comprising:
a plurality of microphones;
a Fourier transform unit configured to performing a Fourier transform for input signals of a time domain received by the plurality of microphones;
a first sound source section detecting unit configured to detect a first sound source section on the basis of an average power value of the Fourier-transformed input signals;
a second sound source section detecting unit configured to detect a second sound source section from which wind noise has been removed, on the basis of the first sound source section and a difference of power values of the input signals received by the microphones; and
a sound source position detecting unit configured to detect a location of a sound source on the basis of the second sound source section and a phase difference of the input signals received by the plurality of microphones.

7. The device for localizing a sound source by removing wind noise according to claim 6, further comprising:
a reliability calculating unit configured to calculate reliability for the detection of a location of the sound source,
wherein the first sound source section detecting unit detects the first sound source section only when the first sound source section is continuously formed.

8. The device for localizing a sound source by removing wind noise according to claim 6,
wherein the first sound source section detecting unit determines the average power value of the input signals by using Equation 1 below, and
wherein the first sound source section detecting unit determines the first sound source section by using Equation 2 below:

$$P(n) = \frac{1}{M} \sum_{m=1}^{M} \left( 10\log 10 \left( \frac{1}{N_f} \sum_{f=f_{min}}^{f=f_{max}} X^2(n, f) \right) \right) \quad \text{[Equation 1]}$$

$$vad(n) = \begin{cases} 1 & \text{if } P(n) - P_{noise}(n) > TH_1 \\ 0 & \text{otherwise} \end{cases} \quad \text{[Equation 2]}$$

where n represents a frame index, $f_{min}$ represents a minimum frequency of the input signals, $f_{max}$ represents a maximum frequency of the input signals, and $N_f$ represents the number of frequency bins between the minimum frequency ($f_{min}$) and the maximum frequency ($f_{max}$).

9. The device for localizing a sound source by removing wind noise according to claim 8,
wherein the $f_{min}$ is 300 Hz, and the $f_{max}$ is 3.4 kHz.

10. The device for localizing a sound source by removing wind noise according to claim 8,
wherein the second sound source section detecting unit calculates a cross-channel power difference by using Equation 3 below, and
wherein the second sound source section detecting unit determines the presence of wind noise by using Equation 4 below:

$$\Delta P(n) = \quad \text{[Equation 3]}$$
$$\frac{1}{PN_f} \sum_{f_{min}}^{f_{min}} \sum_{m=1}^{P} \|10\log10(X_i^2(n, f)) - 10\log10(X_j^2(n, f))\|$$

$$wdr(n) = \begin{cases} 1 & \Delta P(n) > TH_2 \\ 0 & \text{otherwise} \end{cases} \quad \text{[Equation 4]}$$

where P represents the number of microphone pairs, and $TH_2$ is 5 dB.

* * * * *